US012284022B2

(12) United States Patent
Anjangi et al.

(10) Patent No.: US 12,284,022 B2
(45) Date of Patent: Apr. 22, 2025

(54) RECEIVER SYSTEM AND A METHOD FOR RECEIVING A TRANSMITTED SIGNAL VIA A LONG-RANGE LINK

(71) Applicants: National University of Singapore, Singapore (SG); SUBNERO PTE LTD, Singapore (SG)

(72) Inventors: Prasad Anjangi, Singapore (SG); Mandar Chitre, Singapore (SG); Manu Ignatius, Singapore (SG); Chinmay Prafulla Pendharkar, Singapore (SG)

(73) Assignees: National University of Singapore, Singapore (SG); SUBNERO PTE LTD, Singapore (SG)

( * ) Notice: Subject to any disclaimer, the term of this patent is extended or adjusted under 35 U.S.C. 154(b) by 467 days.

(21) Appl. No.: 17/438,761

(22) PCT Filed: Mar. 13, 2020

(86) PCT No.: PCT/SG2020/050135
§ 371 (c)(1),
(2) Date: Sep. 13, 2021

(87) PCT Pub. No.: WO2020/190210
PCT Pub. Date: Sep. 24, 2020

(65) Prior Publication Data
US 2022/0158718 A1    May 19, 2022

(30) Foreign Application Priority Data
Mar. 15, 2019   (SG) .......................... 10201902330U (51) Int. Cl.
*H04B 7/15*  (2006.01)
*H04L 43/12*  (2022.01)
(Continued)

(52) U.S. Cl.
CPC ............... *H04B 7/15* (2013.01); *H04L 43/12* (2013.01); *H04W 4/80* (2018.02); *H04W 84/04* (2013.01)

(58) Field of Classification Search
CPC .......... H04B 7/15; H04B 7/026; H04L 43/12; H04W 4/80; H04W 84/04
(Continued)

(56) References Cited

U.S. PATENT DOCUMENTS 6,104,712 A *  8/2000  Robert .................... H04L 45/00
                                                          455/432.1
8,121,120 B2   2/2012  Kodaka et al.
(Continued)

OTHER PUBLICATIONS

"Cross-Layer Distributed Diversity for Heterogeneous Wireless Networks" H. Javaheri, G. Noubir, and Y. Wang; International Conference on Wired/Wireless Internet Communications; May 23, 2007 (Year: 2007).*
(Continued)

*Primary Examiner* — Michael Y Mapa
(74) *Attorney, Agent, or Firm* — Michael Best & Friedrich LLP (57) ABSTRACT

A receiver system and a method for receiving a transmitted signal via a long-range link. The system comprises a plurality of interconnected devices in a short-range network, the plurality of devices including at least one main device and one or more assisting devices, the at least one main device and the one or more assisting devices each configured to receive the transmitted signal via the long-range link; wherein the one or more assisting devices are configured to transmit a relayed signal representing the received transmitted signal at the assisting device to the at least one main device via the short-range network; and wherein the at least one main device is configured to generate output data representing the content of the transmitted signal based on
(Continued)

the transmitted signal received at the at least one main device and the one or more relayed signals received from the one or more assisting devices.

18 Claims, 5 Drawing Sheets

(51) Int. Cl.
   *H04W 4/80* (2018.01)
   *H04W 84/04* (2009.01)
(58) Field of Classification Search
   USPC ...... 370/315; 455/41.2, 101, 132–137, 278.1
   See application file for complete search history.

(56) References Cited

U.S. PATENT DOCUMENTS

| | | | |
|---|---|---|---|
| 2002/0167921 A1* | 11/2002 | Vakil | H04W 36/18 370/352 |
| 2003/0026222 A1* | 2/2003 | Kotzin | H04W 88/06 370/335 |
| 2010/0150177 A1* | 6/2010 | Cai | H04B 7/022 370/476 |
| 2012/0231739 A1 | 9/2012 | Chen et al. | |
| 2012/0238208 A1 | 9/2012 | Bienas et al. | |
| 2014/0274081 A1 | 9/2014 | Comeau et al. | |
| 2016/0094255 A1 | 3/2016 | Meredith et al. | |

OTHER PUBLICATIONS

European Patent Office Extended European Search Report for Application No. 20772662.1 dated Apr. 21, 2022 (7 pages).
Wang, et al., "Distributed Cooperation and Diversity for Hybrid Wireless Networks," IEEE, vol. 12, No. 3, Mar. 2013, (13 pages).
Chitre, M., et al., "Variability in link performance of an underwater acoustic network," in 2013 MTS/IEEE Oceans-Bergen. IEEE, 2013, pp. 1-7.
Di Renzo, M., et al., "Spatial modulation for multiple-antenna wireless systems: A survey," IEEE Communications Magazine, vol. 49, No. 12, pp. 182-191, 2011.
Javaheri, H., et al. Cross-Layer Distributed Diversity for Heterogeneous Wireless Networks. International Conference on Wired/Wireless Internet Communications, May 23, 2007, pp. 259-270, accessed Jun. 3, 2020.
Laneman, J.N., et al., "Cooperative diversity in wireless networks: Efficient protocols and outage behavior," IEEE Transactions on Information theory, vol. 50, No. 12, pp. 3062-3080, 2004.
Panic, S., et al., Fading and interference mitigation in wireless communications. CRC press, 2013.
Sendonaris, A., et al., "User cooperation diversity-part i: system description," IEEE transactions on communications, vol. 51, No. 11, pp. 1927-1938, 2003.
Vien, Q.T., et al., Network Coding-Based Retransmission for Relay Aided Multisource Multicast Networks. EURASIP Journal on Wireless Communications and Networking, Feb. 13, 2011, pp. 1-10, accessed Jun. 4, 2020.
Yang, T., "A study of spatial processing gain in underwater acoustic communications," IEEE Journal of Oceanic Engineering, vol. 32, No. 3, pp. 689-709, 2007.

* cited by examiner

RECEIVER SYSTEM AND A METHOD FOR RECEIVING A TRANSMITTED SIGNAL VIA A LONG-RANGE LINK

CROSS REFERENCE TO RELATED APPLICATIONS

This application is a national stage filing under 35 U.S.C. § 371 of International Patent Application No.: PCT/SG2020/050135, filed Mar. 13, 2020, which claims priority to Singapore Patent Application No. 10201902330U, filed Mar. 15, 2019, the entire contents of which are hereby incorporated by reference herein.

FIELD OF INVENTION

The present invention relates broadly to a receiver system and a method for receiving a transmitted signal via a long-range link, in particular to the field of spatial diversity wireless communication receivers and more specifically to a system and method for improving the reception of signals by digitally combining signals from cooperative devices.

BACKGROUND

Any mention and/or discussion of prior art throughout the specification should not be considered, in any way, as an admission that this prior art is well known or forms part of common general knowledge in the field.

Channel fading caused by multipath propagation and shadowing limits the performance of a long-range wireless link to receiving devices [1]. These are critical challenges in any wireless communication medium as they are often the cause for poor system performance. A typical approach to overcome this challenge is through exploiting channel diversity by adding independent transmission paths [2]. This requires multiple antennas to be co-located on the same physical device, both at the transmitter as well as at the receiving devices. A minimal spatial separation is required between the antennas to achieve diversity and the separation is dependent on the wireless medium (e.g., terrestrial radio-frequency link, or underwater acoustic link etc.) in use as well as the operational frequency band [1], [3], [4]. In case of the acoustic underwater links, the spatial separation is in order of meters [5] due to the commonly used operational frequency band.

Embodiments of the present invention seek to address at least one of the above problems.

SUMMARY

In accordance with a first aspect of the present invention there is provided a receiver system for receiving a transmitted signal via a long-range link, the system comprising:
- a plurality of interconnected devices in a short-range network, the plurality of devices including at least one main device and one or more assisting devices, the at least one main device and the one or more assisting devices each configured to receive the transmitted signal via the long-range link;
- wherein the one or more assisting devices are configured to transmit a relayed signal representing the received transmitted signal at the assisting device to the at least one main device via the short-range network; and
- wherein the at least one main device is configured to generate output data representing the content of the transmitted signal based on the transmitted signal received at the at least one main device and the one or more relayed signals received from the one or more assisting devices.

In accordance with a second aspect of the present invention there is provided a method for receiving a transmitted signal via a long-range link, the method comprising the steps of:
- providing a plurality of interconnected devices in a short-range network, the plurality of devices including at least one main device and one or more assisting devices;
- the at least one main device and the one or more assisting devices each receiving the transmitted signal via the long-range link;
- the one or more assisting devices transmitting a relayed signal representing the received transmitted signal at the assisting device to the at least one main device via the short-range network; and
- the at least one main device generating output data representing the content of the transmitted signal based on the transmitted signal received at the at least one main device and the one or more relayed signals received from the one or more assisting devices.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide the method and apparatus for implementing a cooperative diversity combiner framework. A distributed cooperative diversity receiver system according to an example embodiment is disclosed. A receiver device with capability of cooperative diversity combining according to an example embodiment, also referred to as a main device herein, for use in the distributed cooperative diversity receiver system is also disclosed. The distributed cooperative diversity receiver system according to an example embodiment includes spatially separate receiver devices, a collator unit, and a combiner unit.

The collator unit and the combiner unit can be provided in a main device, as one of the spatially separate receiver devices. The spatially separate receiver devices according to example embodiments receive the signals transmitted from a source device due to the broadcast nature of the wireless channel. Since there might be more than one transmitter in a network, different transmitted packets can be received simultaneously. The collator unit's objective is to collate all the received signals from all the spatially separate receiver devices which are distributed on a short-range hybrid network, according to example embodiments. The collator unit outputs a set of associated received signals for the combiner unit. The association process identifies the appropriate signals to combine, according to example embodiments. The combiner unit then combines the associated received signals and the data is decoded, according to example embodiments.

Figure 1:
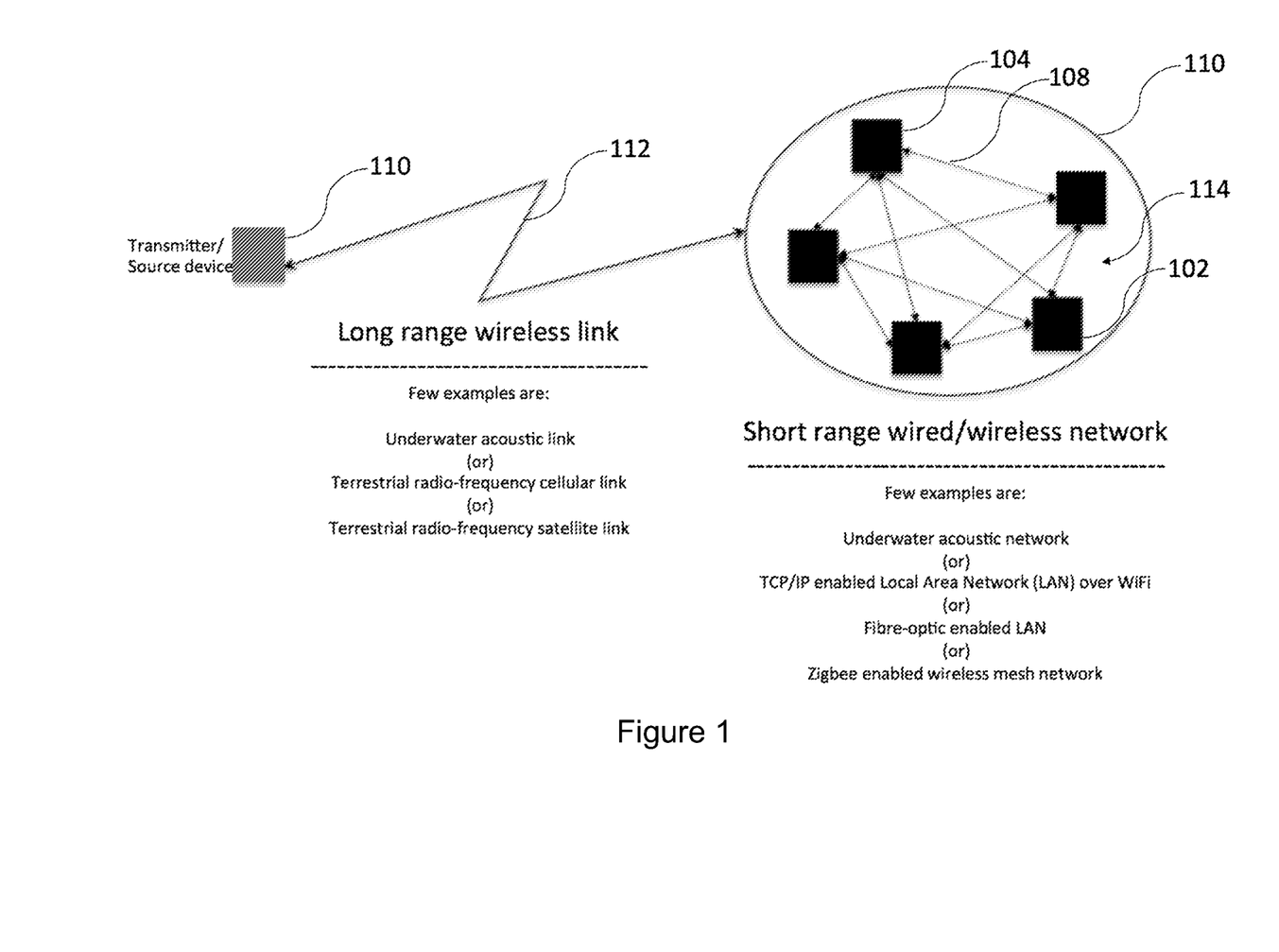
FIG. 1 shows a schematic diagram illustrating a receiver system for processing a transmitted signal received via a long-range link, according to an example embodiment.

FIG. 1 is a schematic drawing illustrating a general overview of a receiver system 100 according to an example embodiment. Specifically, the receiver system 100 is in the form of a distributed heterogeneous network in this example embodiment, where the spatially separated receiver devices e.g. 102, 104 acting as the collective receiver system 100 according to an example embodiment are connected via short-range links e.g. 108 (wired/wireless), whereas the transmitter 110 to the collective receiver device 100 is only available on a long-range wireless link 112. The distributed cooperation strategy according to example embodiments intends to utilize a group of spatially separated receiver devices e.g. 102, 104. This cooperation is preferably transparent to the application user since the technique is implemented utilizing the low-level physical layer signaling, according to an example embodiment. Therefore, the existing applications will observe an increase in performance without requiring any hardware modifications.

If the spatially separated receiver devices e.g. 102, 104 are available on a Local Area Network (LAN) (e.g. TCP/IP enabled WiFi network, Fiber-optic LAN etc.) as shown in FIG. 1, it has been recognized by the present inventors that it is advantageously possible for these receiver devices e.g. 102, 104 to cooperate. It is noted that the present invention is not limited to any particular type of link e.g. 108 in the short-range network. The links may potentially be hybrid, but any link technology may be used that enables the devices e.g. 102, 104 to communicate and exchange information. For example, one can consider an underwater acoustic modem deployed at the sea bottom transmitting at 24 kHz. If it is assumed that the collective receiver devices e.g. 102, 104 are deployed from a boat and are approximately located at a distance of 2 km from the transmitter and are available on a high-speed WiFi-enabled LAN, then each packet transmitted acoustically underwater is received on all the receiver devices e.g. 102, 104 in the short-range network 114 since it is a broadcast channel. Each of these spatially distributed receiver devices e.g. 102, 104 will suffer from typical channel fading due to multipath, spreading loss and signal attenuation as learned from experiments and decades of research [6]. In an example embodiment, the long-range acoustically transmitted packets are:

independently received at each receiver device e.g. 102, 104 collated at a main receiver device 102 through relaying using WiFi-enabled LAN on the boat and combined at the main receiver device 102.

The cooperation strategy according to example embodiment allows the receiver devices e.g. 102, 104 to forward the information bearing signals to other receiver devices through the local wired/wireless network 114 [7]. In an ideal scenario, there are no other transmissions in the network 114 while the transmitter 110 transmits a packet. In reality, this may not be the case even with a Medium Access Control (MAC) since there might be hidden devices in the communication range of undesired transmitters. This may result in more than one signal being received at certain receiver devices e.g. 102, 104 for each packet transmitted. This can also happen with a single transmitter 110 in the underwater acoustic network when there are strong reflections due to reflectors at large enough distances. This gives rise to a set of signals which cannot be simply combined since all of them do not correspond to the same transmission. Therefore, there is advantageously an associater unit which associates the signals corresponding to the same transmission and is given as an input to the combiner unit, according to example embodiments and as will be described in more detail below.

A receiver device e.g. 102, 104 in this context is defined as a device which is capable of cooperating with other receiver devices in a distributed fashion utilizing a short-range network infrastructure. The receiver devices include at least one main device 102 and one or more assisting devices e.g. 104. The associater unit and the combiner unit are preferable provided in the at least one main device 102, whereas the assisting devices e.g. 104 are capable of relaying received signals to the at least one main device 102.

Figure 2:
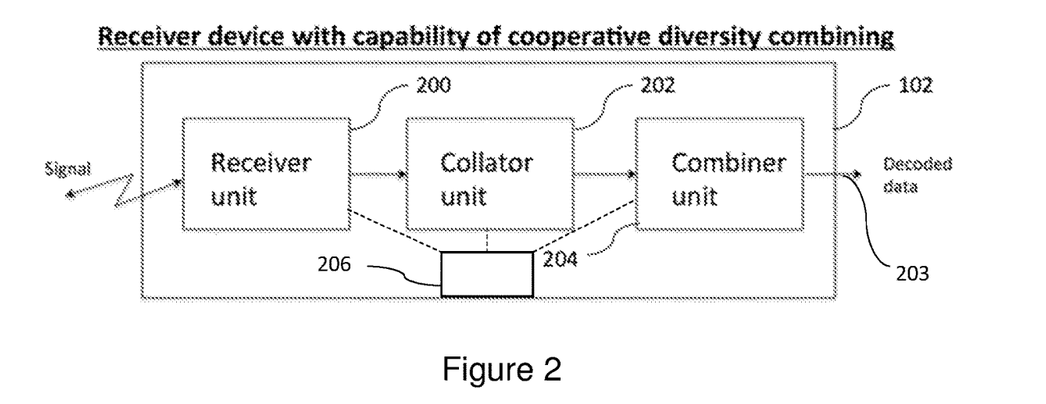
FIG. 2 shows a schematic diagram of a receiver device capable of cooperative diversity combining, according to an example embodiment.

In FIG. 2, a block diagram illustrating each of the main devices e.g. 102 with the cooperative diversity combining capability in the short-range network 114 (FIG. 1) according to an example embodiment is depicted. Each such "main" device e.g. 102 with the cooperative diversity combining capability is composed of three main components according to an example embodiment as shown in FIG. 2: a receiver unit 200, a collator unit 202 and a combiner unit 204. The input to the main device 102 is an analog signal 201 that is in the channel due to the transmission of the packet from the transmitter 110 (FIG. 1). The output of the main device 102 is the error-free decoded data 203. In the following, the objective and operation of each of the above-mentioned units according to example embodiments will be described. A transceiver or communication unit 206 is provided for communication between the receiving devices on the network links 108 (FIG. 1).

As mentioned above, in embodiments of the present invention, at least one of the receiver devices 102 (FIG. 1) may be configured as a main device with the cooperative diversity combining capability. Those receiver devices e.g. 104 (FIG. 1) that are not configured as a main device with the cooperative diversity combining capability, need not include the collator unit 202 and the combiner unit 204, and may merely be configured with a receiver unit 200 and the transceiver or communication unit 206 to transmit or relay pre-processed signals to the at least one main receiver device 102. It is noted that each main device e.g. 102 may be configured to function as an assisting device for another main device, or vice versa.

Figure 3:
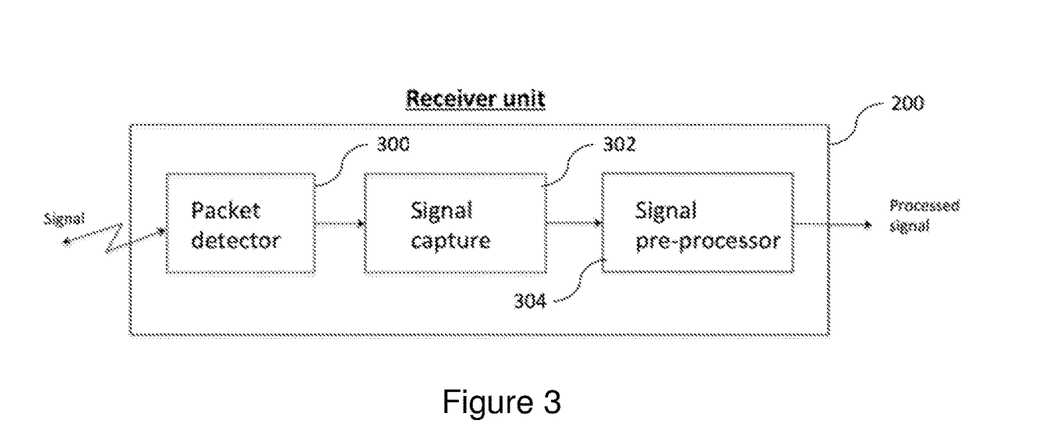
FIG. 3 shows a schematic diagram of the receiver unit inside each of the spatially separated receiver devices of the receiving system of FIG. 1.

The receiver unit 200 will now be described in more detail. The receiver unit 200 as shown in FIG. 3 consists of three sub-units. A packet detector 300 which receives the input signal 201, followed by a signal capture unit 302, the output of which is fed to a signal pre-processor unit 304. Every packet usually contains a special sequence of symbols. Such a sequence is used for the packet detection at the receiver 200. The receiver 200, specifically the packet detector 300 in this embodiment, runs correlators which trigger whenever a strong correlation is computed on the received sequence. At the event of such a trigger, signaling a probable packet detection, the receiver unit 200 captures the signal for a duration which is equal to the packet duration. This is the objective of the signal capture unit 302 upon the event of packet detection by the packet detector 300. The signal captured by the receiver unit 200 can be represented in either a passband (real-valued numbers) or complex baseband. Although the specific representation of the signal does not affect the proposed framework according to example embodiments, it is noted that the passband representation of the signals can be large in size at higher sampling rates and therefore might require a substantially larger bandwidth in the short-range network 114 (FIG. 1) for cooperation among the receiver devices e.g. 102, 104 (FIG. 1) for diversity combining.

The captured signal is then fed to the signal pre-processor 304 which is a signal processing chain to remove out-of-band noise and to remove the possible artifacts introduced at the transducer/antenna reception. The output of the receiver unit 200 is a processed signal 303 which can be associated with other received and collated signals by the collator unit 202 (FIG. 2). For example, the processed signal at some or all of the assisting devices e.g. 104 (FIG. 1) in the short-range network 114 (FIG. 1) can be shared with the main device 102 (FIG. 1) over a WiFi LAN. It is noted that the processed signal 203 may already be decodable based on the received signal 201 at the receiver unit 200 of the main device (FIG. 2), in which case the cooperative diversity combining capability according to example embodiments may not have to be utilised.

The collator unit 202 (FIG. 2) will now be described in more detail. The objective of a collator unit 202 according to example embodiments is two-fold:
  to collate all the received signals received on all the receiver units e.g. 102, 104 which are co-located in the short-range network 114 (FIG. 1)
  and to associate the signals which correspond to the same transmission using an associater unit 400 (FIG. 4).

Returning initially to FIG. 1, there are many approaches to implementing a strategy or protocol to collate all the received signals at the main device 102, according to different embodiments. For example, in one embodiment the main device 102 broadcasts a cooperation request message in the short-range network 114 if it is unable to decode the packet based on the received transmitted signal at its own receiver unit 200 (FIG. 2). Upon the reception of the cooperation request message, the other assisting devices e.g. 104 in the short-range network 114 transmit the processed signal at the output of their corresponding receiver unit (compare 200, FIGS. 2 and 3) for combining at the main device 102. It may not be necessary that all the assisting devices in the short-range network 114 need to assist. There can be smarter choices if the Signal-to-Noise Ratio (SNR) estimates of the processed signal are maintained at each receiver device e.g. 102, 104. For example, only a certain number of receiver devices with SNR greater than a particular threshold might be used as the assisting devices according to an example embodiment. At the end of this process, a set of individual, dissociated signals are available at the main device 102.

Figure 4:
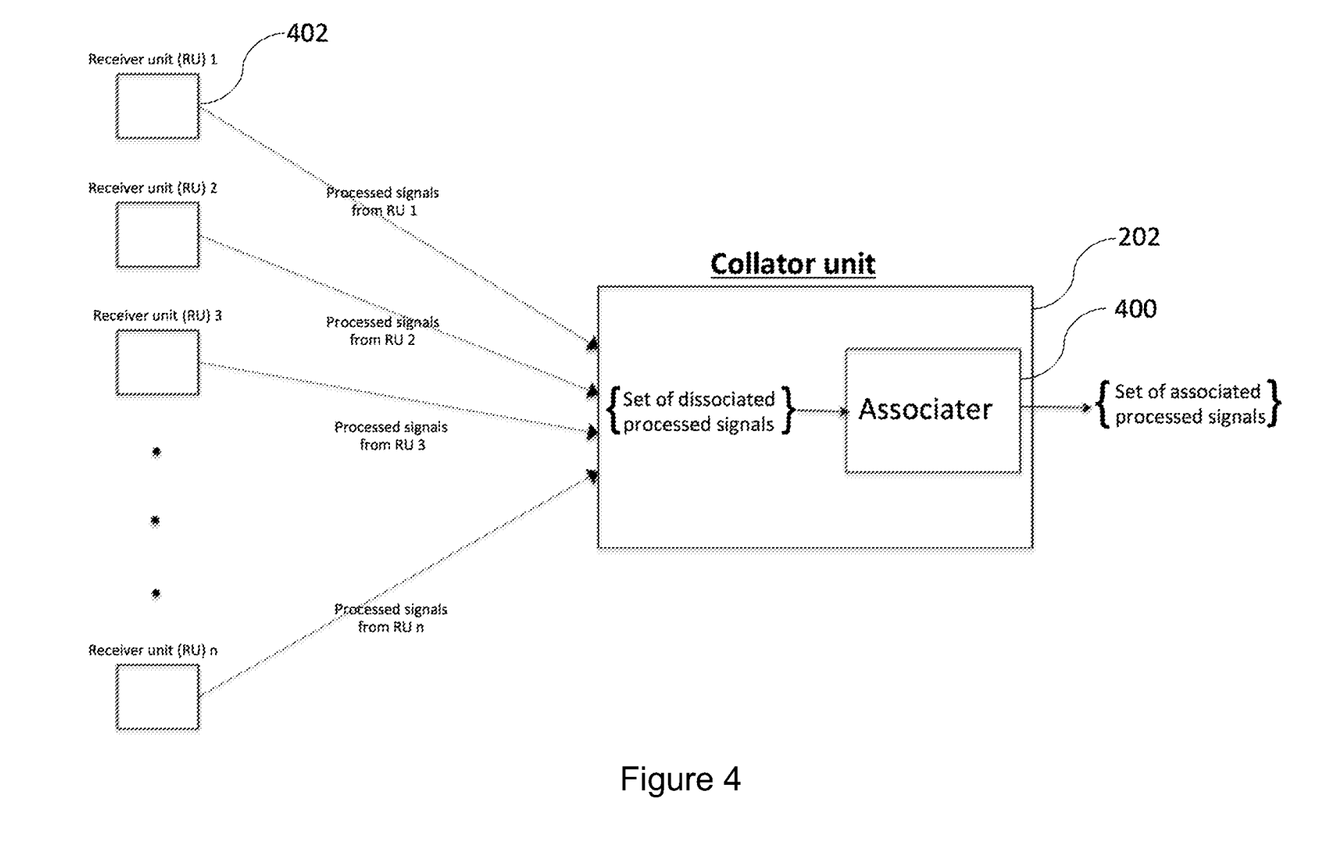
FIG. 4 shows a schematic diagram illustrating operation of the collator unit of the receiver device of FIG. 2.

Next, this set of signals 401 is given as an input to the associater unit 400 of the collator unit 202 as shown in FIG. 4. The objective of the associater unit 400 according to an example embodiment is to associate the signals together which correspond to the same packet transmission. This can e.g. be achieved if the timestamp of the packets received at the different receiving units e.g. 402 of the respective receiving devices is known. For this reason, each transmission and reception of the packet is preferably tagged with the local machine time. The assumption here is that the times are synchronized among the receiver devices in the network, which can for example be readily achieved if the devices are connected to the internet or, as another example, the clock offset between the individual receiver devices, internal clocks can be measured and used for time synchronization, as is understood in the art and will not be described in detail herein.

The output of the collator unit 202 after the above-mentioned steps is a set of associated signals 500 which can be combined at the main device's combiner unit 204 (compare FIG. 2).

Figure 5:
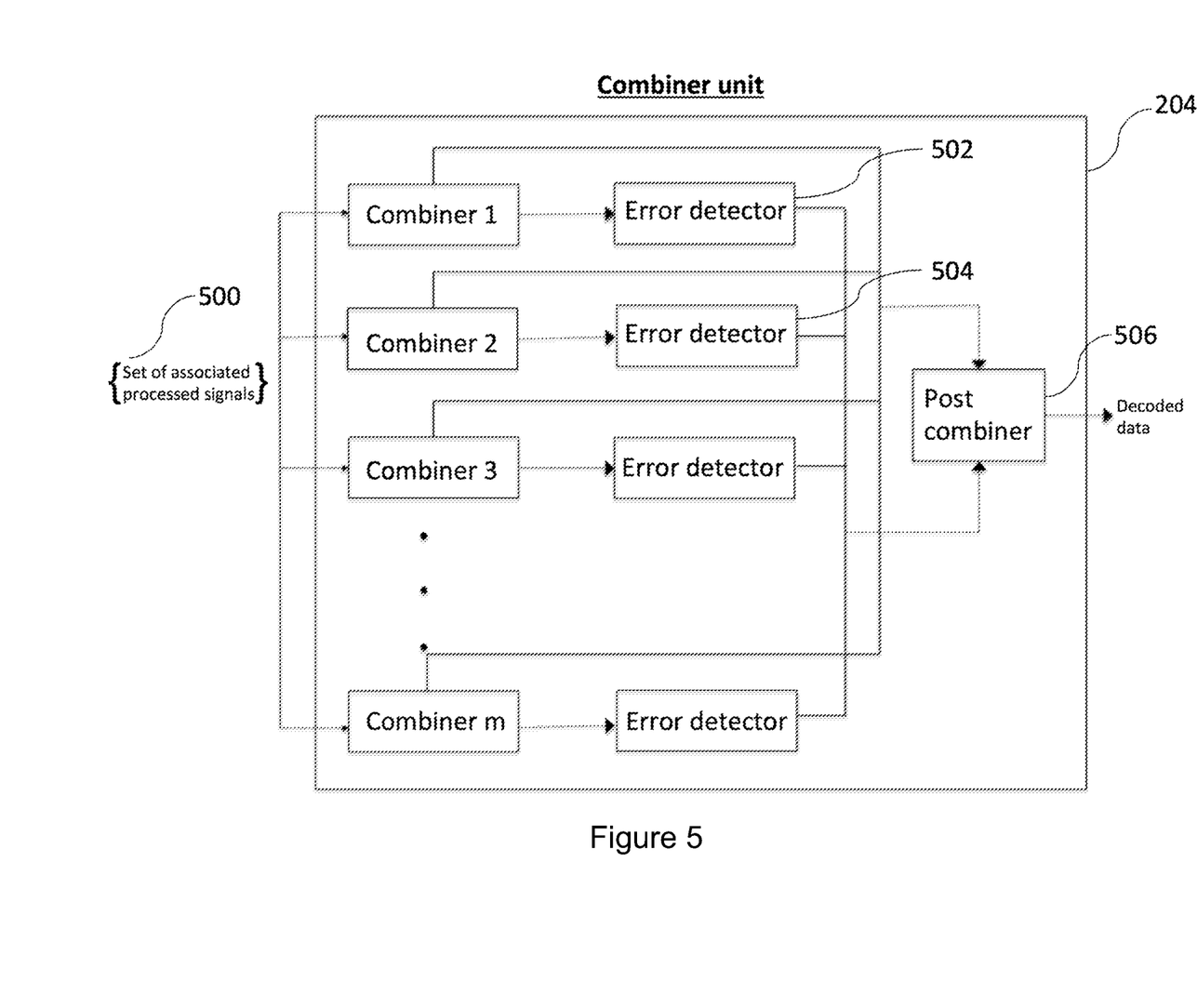
FIG. 5 shows a schematic diagram illustrating operation of the combiner unit of the receiver device of FIG. 2.

The combiner unit 204 will now be described in more details. As shown in FIG. 5, the proposed framework according to an example embodiment is independent of the type of combiner used for combining the signals. Some examples of the combiners are Maximal Ratio Combiner (MRC), Equal Gain Combiner (EGC), Selection Combiner (SC) etc [8]. Any such combiner is denoted in FIG. 5 as Combiner 1 . . . m. The set of associated signals 500 are fed to each of the combiners. After combining the signals, a soft-demodulation can be applied to the combined signals to generate the bit-sequence. This bit-sequence is given as an input to the error detector e.g. 502, 504 as well as the post-combiner unit 506. If the errors are detected, the number of errors are also given as an input to the post-combiner unit 506 along with the bit-sequence. A post-combiner 506 implements the logic to utilize the information in an optimal manner to select the combiner output that successfully decoded the data.

Figure 6:
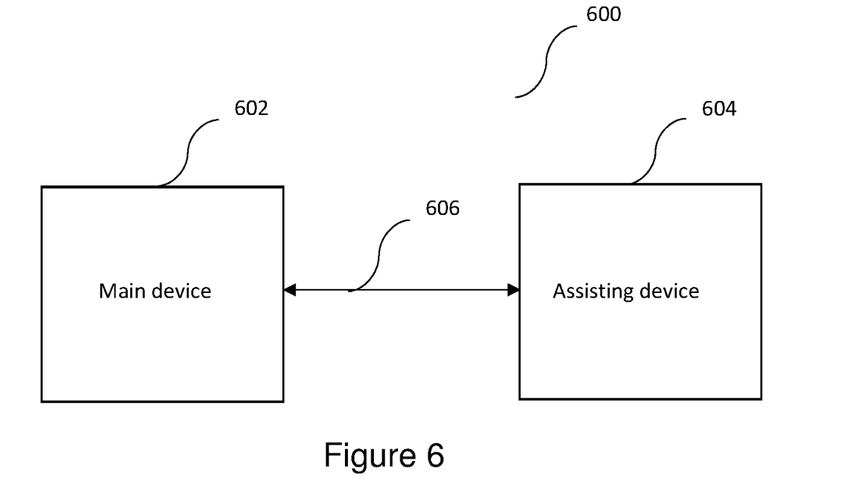
FIG. 6 shows a schematic diagram illustrating a receiver system for receiving a transmitted signal via a long-range link, according to an example embodiment.

FIG. 6 shows a schematic diagram illustrating a receiver system 600 for receiving a transmitted signal via a long-range link, according to an example embodiment. The system 600 comprises a plurality of interconnected devices 602, 604 in a short-range network 606 the plurality of devices 602, 604 including at least one main device 602 and one or more assisting devices 604, the at least one main device 602 and the one or more assisting devices 604 each configured to receive the transmitted signal via the long-range link; wherein the one or more assisting devices 604 are configured to transmit a relayed signal representing the received transmitted signal at the assisting device to the at least one main device 602 via the short-range network 606; and wherein the at least one main device 602 is configured to generate output data representing the content of the transmitted signal based on the transmitted signal received at the at least one main device 602 and the one or more relayed signals received from the one or more assisting devices 604.

The short-range network 606 may be heterogenous.

The at least one main device 602 may be configured to identify associated ones amongst a group consisting of the received relayed signals from the one or more assisting devices 604 and the transmitted signal received at the at least one main device 602. The at least one main device 602 may be configured to process the associated signals to generate the output data.

The one or more assisting devices 604 may be configured to be capable of functioning as a main device.

The at least one main device 602 may be configured to be capable of functioning as an assisting device.

The at least one main device 602 and the one or more assisting devices 604 may be configured to perform packet detection on the received transmitted signal. The at least one main device 602 and the one or more assisting devices 604 may be configured to perform signal capture on the received transmitted signal triggered by detecting a packet in the received transmitted signal. The at least one main device 602 and the one or more assisting devices 604 may be configured to perform pre-processing on the captured signal.

The one or more assisting devices 604 may be configured to transmit the relayed signal to the at least one main device

602 only if a signal-to-noise ratio in the received transmitted signal at the assisting device meets a threshold.

Figure 7:
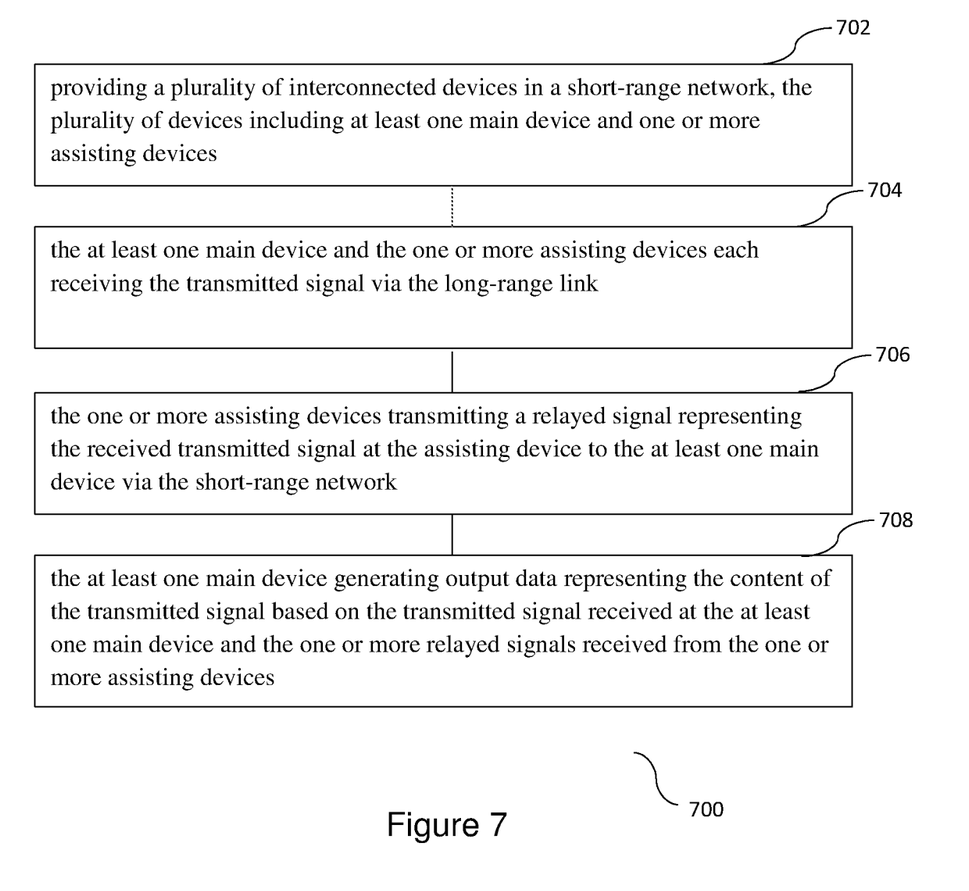
FIG. 7 shows a flow chart illustrating a method for receiving a transmitted signal via a long-range link, according to an example embodiment.

FIG. 7 shows a flow chart 700 illustrating a method for receiving a transmitted signal via a long-range link, according to an example embodiment. At step 702, a plurality of interconnected devices is provided in a short-range network, the plurality of devices including at least one main device and one or more assisting devices. At step 704, the at least one main device and the one or more assisting devices each receive the transmitted signal via the long-range link. At step 706, the one or more assisting devices transmit a relayed signal representing the received transmitted signal at the assisting device to the at least one main device via the short-range network. At step 708, the at least one main device generates output data representing the content of the transmitted signal based on the transmitted signal received at the at least one main device and the one or more relayed signals received from the one or more assisting devices.

The short-range network may be heterogenous.

The at least one main device may identify associated ones amongst a group consisting of the received relayed signals from the one or more assisting devices and the transmitted signal received at the at least one main device. The at least one main device may process the associated signals to generate the output data.

The one or more assisting devices may be capable of functioning as a main device.

The at least one main device may be capable of functioning as an assisting device.

The at least one main device and the one or more assisting devices may perform packet detection on the received transmitted signal. The at least one main device and the one or more assisting devices may perform signal capture on the received transmitted signal triggered by detecting a packet in the received transmitted signal. The at least one main device and the one or more assisting devices may perform pre-processing on the captured signal.

The one or more assisting devices may transmit the relayed signal to the at least one main device only if a signal-to-noise ratio in the received transmitted signal at the assisting device meets a threshold.

It is to be understood that the above-described embodiments are merely illustrative principles of the invention and many variations may be devised in the future by those skilled in this field.

The various functions or processes disclosed herein may be described as data and/or instructions embodied in various computer-readable media, in terms of their behavioral, register transfer, logic component, transistor, layout geometries, and/or other characteristics.

Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] A. Goldsmith, Wireless communications. Cambridge university press, 2005.
[2] S. Panic, M. Stefanovic, J. Anastasov, and P. Spalevic, Fading and interference mitigation in wireless communications.
CRC press, 2013.
[3] M. Di Renzo, H. Haas, and P. Grant, "Spatial modulation for multiple-antenna wireless systems: A survey," IEEE Communications Magazine, vol. 49, no. 12, pp. 182-191, 2011.
[4] A. Sendonaris, E. Erkip, and B. Aazhang, "User cooperation diversity-part i: system description," IEEE transactions on communications, vol. 51, no. 11, pp. 1927-1938, 2003.
[5] T. Yang, "A study of spatial processing gain in underwater acoustic communications," IEEE Journal of Oceanic Engineering, vol. 32, no. 3, pp. 689-709, 2007.
[6] M. Chitre, I. Topor, R. Bhatnagar, and V. Pallayil, "Variability in link performance of an underwater acoustic network," in 2013 MTS/IEEE OCEANS-Bergen. IEEE, 2013, pp. 1-7.
[7] J. N. Laneman, D. N. Tse, and G. W. Wornell, "Cooperative diversity in wireless networks: Efficient protocols and outage behavior," IEEE Transactions on Information theory, vol. 50, no. 12, pp. 3062-3080, 2004.
[8] J. G. Proakis and M. Salehi, Digital communications. McGraw-hill New York, 2001, vol. 4.

We claim:

1. A communication system for transmitting and receiving a transmitted signal via a long-range underwater link, the system comprising:
a transmitter configured for acoustically transmitting the transmitted signal via the long-range underwater link;
a plurality of interconnected devices in a short-range non-acoustic network, the plurality of devices including at least one main device and one or more assisting devices, the at least one main device and the one or more assisting devices each configured to receive the acoustically transmitted signal via the long-range underwater link;
wherein the one or more assisting devices are configured to transmit a relayed signal representing the received acoustically transmitted signal at the assisting device to the at least one main device via the short-range non-acoustic network;
wherein the at least one main device is configured to generate output data representing the content of the acoustically transmitted signal based on the acoustically transmitted signal received at the at least one main device and the one or more relayed signals received from the one or more assisting devices;
wherein the at least one main device is configured to identify associated ones amongst a group consisting of the received relayed signals from the one or more assisting devices and the transmitted signal received at the at least one main device, wherein identifying the associated ones amongst the received relayed signals from the one or more assisting devices and the transmitted signal received at the at least one main device comprises comparing timestamps of packets to identify all such packets which correspond to a single packet transmitted from the transmitter and received by the one or more assisting devices and the at least one main device; and
wherein the at least one main device is configured to generate a set of associated signals comprising the identified associated ones amongst the group consisting of the received relayed signals from the one or more assisting devices and the transmitted signal received at the at least one main device, to combine the set of associated signals into a combined signal and to demodulate the combined signal to generate a bit-sequence representing the received transmitted signal.

2. The system of claim 1, wherein the short-range non-acoustic network comprises a TCP/IP enabled WiFi network or a Fiber-optic LAN.

3. The system of claim 1, wherein the at least one main device is configured to process the associated signals to generate the output data.

4. The system of claim 1, wherein the one or more assisting devices are configured to function as a main device.

5. The system of claim 1, wherein the at least one main device is configured to function as an assisting device.

6. The system of claim 1, wherein the at least one main device and the one or more assisting devices are configured to perform packet detection on the received transmitted signal.

7. The system of claim 6, wherein the at least one main device and the one or more assisting devices are configured to perform signal capture on the received transmitted signal triggered by detecting a packet in the received transmitted signal.

8. The system of claim 7, wherein the at least one main device and the one or more assisting devices are configured to perform pre-processing on the captured signal.

9. The system of claim 1, wherein the one or more assisting devices are configured to transmit the relayed signal to the at least one main device only when a signal-to-noise ratio in the received transmitted signal at the assisting device meets a threshold.

10. A method for transmitting and receiving a transmitted signal via a long-range underwater link, the method comprising the steps of:
acoustically transmitting the transmitted signal via the long-range underwater link;
providing a plurality of interconnected devices in a short-range non-acoustic network, the plurality of devices including at least one main device and one or more assisting devices;
the at least one main device and the one or more assisting devices each receiving the acoustically transmitted signal via the long-range underwater link;
the one or more assisting devices transmitting a relayed signal representing the received acoustically transmitted signal at the assisting device to the at least one main device via the short-range non-acoustic network; and
the at least one main device generating output data representing the content of the transmitted signal based on the acoustically transmitted signal received at the at least one main device and the one or more relayed signals received from the one or more assisting devices;
wherein the at least one main device identifies associated ones amongst a group consisting of the received relayed signals from the one or more assisting devices and the transmitted signal received at the at least one main device;
identifying the associated ones amongst the received relayed signals from the one or more assisting devices and the transmitted signal received at the at least one main device comprises comparing timestamps of packets to identify all such packets which correspond to a single packet transmitted from the transmitter and received by the one or more assisting devices and the at least one main device;

generating a set of associated signals comprising the identified associated ones amongst the group consisting of the received relayed signals from the one or more assisting devices and the transmitted signal received at the at least one main device;

combining the set of associated signals into a combined signal; and demodulating the combined signal to generate a bit-sequence representing the received transmitted signal.

11. The method of claim 10, wherein the short-range network comprises a TCP/IP enabled WiFi network or a Fiber-optic LAN.

12. The method of claim 10, wherein the at least one main device processes the associated signals to generate the output data.

13. The method of claim 10, wherein the one or more assisting devices are configured to function as a main device.

14. The method of claim 10, wherein the at least one main device is configured to function as an assisting device.

15. The method of claim 10, wherein the at least one main device and the one or more assisting devices perform packet detection on the received transmitted signal.

16. The method of claim 15, wherein the at least one main device and the one or more assisting devices perform signal capture on the received transmitted signal triggered by detecting a packet in the received transmitted signal.

17. The method of claim 16, wherein the at least one main device and the one or more assisting devices perform pre-processing on the captured signal.

18. The method of claim 10, wherein the one or more assisting devices transmit the relayed signal to the at least one main device only when a signal-to-noise ratio in the received transmitted signal at the assisting device meets a threshold.

* * * * *